Feb. 5, 1957　　　K. O. SEILER　　　2,780,539
PROCESS OF SMELTING GERMANIUM
Filed Jan. 2, 1953
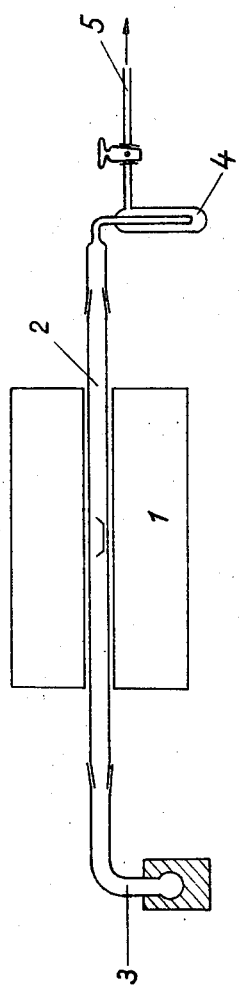
INVENTOR
K SEILER
BY *R. P. Morris*
ATTORNEY

United States Patent Office 2,780,539
Patented Feb. 5, 1957

2,780,539
PROCESS OF SMELTING GERMANIUM

Karl O. Seiler, Nurnberg, Germany, assignor to International Standard Electric Corporation, New York, N. Y., a corporation of Delaware Application January 2, 1953, Serial No. 329,425

Claims priority, application Germany January 10, 1952

1 Claim. (Cl. 75—84)

This invention relates to new and useful improvements in crucibles and particularly in quartz crucibles suitable for the smelting of substances like germanium and silicon of great purity.

It has been observed that varying amounts of contaminating impurities enter during smelting in the direction in which the substance solidifies. To counteract this, the borderline between the solid and fluid phases of the substance was advanced in one direction by a high frequency heating coil moved in the same direction with respect to the substance, or vice versa. Since the solubility of impurities is different in the solid and fluid phases of the smelted material, the quantity of impurities is often greater in that portion of the substance which is last to solidify.

A further objection to existing processes is that the material of the crucible may contaminate the substance to be smelted, particularly at the high smelting temperatures which are required for germanium and the like. The objections to a graphite crucible are that it dissolves in germanium, and that it is too rich in gas for use in high vacuum smelting procedure. Therefore, the crucibles for producing pure germanium and the like are usually made of quartz.

I have found that the quality of substances like germanium and the rapidity and effectiveness of the smelting process can be materially improved if the quartz crucible is coated with a thin layer of amorphous carbon.

According to the invention the coating of the quartz crucible with amorphous carbon is accomplished by drawing benzene or some other hydrocarbon, which can be easily purified by distilling, through an oven heated to a temperature of approximately 900° C. This will cause the cracking of the hydrocarbon in the oven, and the quartz crucible or shuttle which is placed in the oven will become coated with an extremely thin layer of amorphous carbon. The highly volatile hydrocarbons and hydrogen are drawn off by a suitable pump, e. g. a water stream pump.

The process and crucible are applicable to the smelting of any material which does not react with amorphous carbon.

The carbon layer will give off only little gas in high vacuum and, for some reason which I am unable to explain, does not dissolve in germanium or the like.

The molten product can be easily dropped out of such crucible without damage to the latter, whereas germanium became attached to the walls of uncoated quartz crucibles necessitating the breaking of the crucible in removing its contents.

From time to time the amorphous carbon coating should be burned off and the quartz crucible recoated.

In the attached drawings I have schematically illustrated the nature of my process. 1 is the oven surrounding a tube 2 which encloses the quartz crucible to be coated. The left end of the tube may be attached to a container 3 of benzene or some other hydrocarbon. The right end of the tube 2 terminates in a trap 4 which is maintained at room temperature and is connected via a valved conduit 5 with a water jet pump or the like.

In practicing the process the crucible is placed in the tube 2 which is first heated to a moderate initial temperature of 300° C., then the container 3 is connected to the tube and the trap 4 is connected to the pump. After the pumping is effective, the benzene is placed in a temperature bath of 0° C., then for 10 to 12 minutes the temperature of tube 2 is increased to 830° C. while the pump operates continuously. The pump is then turned off, the temperature is raised to 900° C. and maintained at that level for a period of 20 minutes. The oven is then permitted to cool to said initial temperature of 300° C. or even down to 200° C. The crucible is now coated and may be removed from the tube.

I claim:

In the process of smelting germanium the steps comprising preparing a crucible of quartz by placing the crucible within an oven and cracking a hydrocarbon within the oven at a temperature below the softening point of quartz to form a thin film of amorphous carbon on the crucible, and melting germanium material within the crucible.

References Cited in the file of this patent

UNITED STATES PATENTS

| | | |
|---|---|---|
| 805,304 | Kuch | Nov. 21, 1905 |
| 1,474,009 | Straw | Nov. 13, 1923 |
| 2,392,682 | Marek | Jan. 8, 1946 |
| 2,576,267 | Scaff et al. | Nov. 27, 1951 |

FOREIGN PATENTS

| | | |
|---|---|---|
| 541,241 | Great Britain | 1941 |